United States Patent [19]

Shikada et al.

[11] Patent Number: 5,002,921

[45] Date of Patent: Mar. 26, 1991

[54] CATALYZER FOR DECOMPOSING AMMONIA

[75] Inventors: Tsutoma Shikada; Asanuma Minoru; Takao Ikariya, all of Tokyo, Japan

[73] Assignee: NKK Corporation, Tokyo, Japan

[21] Appl. No.: 546,679

[22] Filed: Jun. 29, 1990

Related U.S. Application Data

[63] Continuation of Ser. No. 329,783, filed as PCT JP88/01075 on Oct. 21, 1988, published as WO89/04210 on May 18, 1989, abandoned.

[51] Int. Cl.$^5$ ............................................. B01J 23/58
[52] U.S. Cl. ..................................... 502/328; 502/330
[58] Field of Search ........................ 502/174, 328, 330

[56] References Cited

U.S. PATENT DOCUMENTS

| | | | |
|---|---|---|---|
| 3,315,008 | 4/1967 | Abell et al. | 502/328 X |
| 3,819,536 | 6/1974 | Dalla Betta et al. | 502/328 X |
| 3,880,775 | 4/1975 | Gandhi et al. | 502/328 X |
| 3,980,589 | 9/1976 | Murrell et al. | 502/328 |
| 4,081,510 | 3/1978 | Kato et al. | 502/330 X |

*Primary Examiner*—W. J. Shine
*Attorney, Agent, or Firm*—Moonray Kojima

[57] ABSTRACT

For carrying out a process for decomposing, into hydrogen and nitrogen, ammonia recovered from a coke oven gas by combining a catalytic combustion of ammonia and a catalytic decomposition of ammonia utilizing a waste heat by said combustion, a basic compound as a required catalyzer is added to ruthenium supported on alumina, or ruthenium as a required catalyzer is supported on a basic compound, whereby ammonia may be decomposed effectively at ranges of low temperatures as not more than 500° C.

1 Claim, No Drawings

CATALYZER FOR DECOMPOSING AMMONIA

This application is a continuation of application Ser. No. 06/840,578 filed as PCT FR85/00131 on May 28, 1985, published as WO85/05713 on Dec. 14, 1985, now abandoned.

TECHNICAL FIELD

The present invention relates to a catalyzer for decomposing ammonia, which has been recovered from a coke oven gas, into hydrogen and nitrogen at low temperatures as 400 to 500° C.

BACKGROUND OF THE INVENTION

A gas generated in a coke oven contains ammonia of 6 to 10 g/Nm$^3$, and it must be removed since it causes corrosion in pipings of the coke oven gas (called as "COG" hereinafter) and generates NOx at combustion of COG. As methods of removing ammonia from COG, in general COG is washed with dilute sulfuric acid and ammonium sulfate is recovered. However, this method is very poor in payability, because fertilizers of ammonium sulfate have been very little required nowadays, and a market price has largely fallen accordingly, and the treatment of ammonia by the production of ammonium sulfate is not valuable industrially. Presently, the production of ammonium sulfate has been cut down, and there are other ammonia treatments, for example, Phosam method which produces liquid ammonia of high purity; Koppers method which separates ammonia and burns it directly; or Carl Still method which burns ammonia under the presence of a catalyzer. But, since these methods are not perfectly satisfactory, either, in view of economical treatments, various improvements have been attempted, and at the same time new processes of ammonia treatments have been developed vigrously.

Under these circumstances, the inventors developed and proposed a treating method of ammonia recovered from COG, which comprised, burning ammonia catalytically under the presence of air to change into nitrogen and water, decomposing it catalytically by a heat caused by said burning, and recovering hydrogen.

There have been up to now submitted many reports with respect to catalyzers useful to ammonia decomposition. For example, "CATALYSIS Science and Technology" describes, vol. 1, page 118 (1981), useful catalysis elements such as molybdenum, tungsten, rhenium, iron, ruthenium, cobalt, rhodium, nickel, platinum, copper and vanadium.

The ammonium decomposition has been utilized industrially to production of an atmospheric gas to be used to brighten annealings of stainless steel or nickel steels and the catalyzers thereof are $Fe_2O_3$-$Al_2O_3$, NiO-$SiO_2$-$Al_2O_3$ and Pt-$Al_2O_3$. These catalyzers are used at space velocity of 500 to 1000ml/ml.h and at temperatures of 500 to 900° C., substantially 700 to 1200° C. But, foregoing catalyzers such as $Fe_2O_3$-$Al_2O_3$, NiO-$SiO_2$-$Al_2O_3$, pt-$Al_2O_3$ and Ru-$Al_2O_3$ have problems as mentioned under, requiring high temperatures as 700 to 1200° C. for decomposing ammonia perfectly:

(1) Heat resistant materials are required for reactors.
(2) Energy is much consumed for maintaining reaction temperature high.

The present invention has been developed for settling these problems about the prior art, and is to propose a catalyzer for decomposing ammonia into hydrogen and nitrogen at low temperature ranges.

DISCLOSURE OF THE INVENTION

The inventors have succeeded in making an ammonia decomposition catalyzer which may decompose ammonia at ranges of low temperature of not more than 500° C. and change into nitrogen and hydrogen in a process which combines a catalytic combustion of ammonia and a catalytic decomposition of ammonia utilizing a waste heat generated by said catalytic combustion.

It has been known that ruthenium is useful to the decomposition reaction of ammonia, for example, "J. Am. Chem. Soc." refers to Ru-$Al_2O_3$ in vol. 76, page 4201 (1954), and "Trans. Faraday Soc." describes ruthenium film in vol. 56, page 144 (1960). In view of these matters, an important characteristic of the invention is present in that basic compounds are contained in the catalyzers, whereby the ammonia decomposition activity of ruthenium is improved considerably, and this tendency is remarkable at low temperatures of not more than 500° C.

The present catalyzer will be prepared by two methods of
(1) adding the basic compound as a third element to Ru-$Al_2O_3$, and
(2) employing the basic compound as a carrier.

A first reference will be made to the method (1). The basic compounds referred to herein are oxides of alkali metals such as $Li_2O$, $Na_2O$, $K_2O$, $Rb_2O$ or $Cs_2O$, inorganic salts of carbonate, hydroxide, nitrate of alkali metals, organic salts of acetates of alkali metals, oxides of alkaline earth metals of MgO, CaO, SrO or BaO, inorganic salts of carbonate, hydroxide, nitrate of alkaline earth metals, and organic salts of acetate of alkaline earth metals. The basic compound and ruthenium are mixed together, such as by dissolving in water, and then impregnated into the alumina carrier. When ruthenium is supported on alumina, available ruthenium compounds are, for example, water soluble such as ruthenium chloride, ruthenium nitrate or ruthenium acetate, or soluble in an organic solvent such as ruthenium carbonyl ($Ru_3(CO)_{12}$) Ordinary impregnation methods may be utilized to loading the basic compound and ruthenium.

It is preferable to contain 0.1 to 2.0 wt% ruthenium in the catalyzer, and contain 1 to 20 wt% basic compound calculated as oxide.

The basic compounds used as the carrier in the method (2) are oxides, carbonate of alkaline earth metals, or mixed oxide compound of alumina, silica gel, or titania together with said oxides and carbonate. Ruthenium is preferably contained in an amount of 0.1 to 2.0wt% in the catalyzer.

The composition of the catalyzer prepared as stated above is dried in air at the temperature of 90 to 150° C. for 12 to 36 hours. If required, it may be calcinated thereafter by an ordinary process. It is preferable that the calcination is performed formed by heating at the temperature of 400 to 600° C. for 1 to 10 hours in nitrogen or air.

The catalyzer composition does not require a pretreatment as a reduction before performing the ammonia decomposition, because the catalyzer is reduced gradually due to hydrogen generated by the ammonia decomposition. If the decomposition activity more stable than at beginning of the reaction is required, the composition is heat-treated, e.g., in a steam of hydrogen at the temperature of more than 200° C., preferably more than 300° C. for 1 to 5 hours.

Samples were taken as follows with respect to the present catalayzers, and will be shown together with results of experiments.

(1) Preparation of the catalyzer

Ruthenium trichloride ($RuCl_3 \cdot 3H_2O$) of 1.03g and potassium nitrate of 10.7g were dissolved in water of about 200 ml, and alumina of 94.5g granulated into 20 to 40 meshes (DC-2282 made by Dia-catalyst) was supplied thereto, evaporated and dried. Subsequently, the above treated substance was dried in the air at the temperature of 120° C. for 24 hours, and calcinated in the air at the temperature of 500° C. for 4 hours, and further treated in a steam of hydrogen at the temperature of 400° C. for 3 hours to obtain a catalyzer (1).

Alumina of 99.5g was prepared without using potassium nitrate in the same manner as the catalyzer (1) to obtain a catalyzer of a comparative example (a).

A catalyzer ($Ru-K_2O-Al_2O_3 = 0.5:2:97.5$ and $0.5:10:89.5$) with different content of potassium from the catalyzer (1), was prepared in the same process as the catalyzer (1) to obtain catalyzers (2) and (3).

Catalyzers ($Ru-K_2O-Al_2O_3 = 0.1:5:94.9$ and $2:5:93$) with different content of ruthenium from the catalyzer (1), were prepared in the same process as the catalyzer (1) to obtain catalyzers (4), (5).

Catalyzers ($Ru-Li_2O-Al_2O_3 = 0.5:5:94.5$, $Ru-Na_2O-Al_2O_3 = 0.5:5:94.5$ and $Ru-Cs_2O-Al_2 = 0.5:5:94.5$) with different sorts of alkali metal from the catalyzer (1), were prepared in the same process as the catalyzer (1) to obtain catalyzers (6), (7) and (8).

Calcium nitrate or barium nitrate ($Ru-CaO-Al_2O_3 = 0.5:5:94.5$ or $Ru-BaO-Al_2O_3 = 0.5:5:94.5$) were used in place of potassium nitrate in the same process as the catalyzer (1) to obtain catalyzers (9) and (10).

Magnesium oxide (made by Kanto Chemicals, Special grade chemical) ($Ru-K_2O-MgO = 0.5:5:94.5$) instead of alumina, was prepared in the same process as the catalyzer (1) to obtain a catalyzer (11).

Iron nitrate ($Fe(NO_3)_3 \cdot 9H_2O$) of 20.3g was dissolved in water of about 200 ml, and alumina of 97.2g was supplied thereto and prepared in the same process as the catalyzer (1) to obtain a catalyzer of a comparative example (b).

Nickel nitrate ($Ni(NO_3)_3 \cdot 6H_2O$) of 99.1g was dissolved in the water of about 200ml, and silica alumina of 80.0g (made by Nikki Chemicals ·N631L) was supplied thereto and prepared in the same process as the catalyzer (1) to obtain a catalyzer of a comparative example (c).

Chloroplatinic acid ($H_2PtCl_6 \cdot 6H_2O$) of 0.530 g was dissolved in water of about 200ml, and alumina of 99.5g was supplied thereto and prepared in the same process as the catalyzer (1) to obtain a catalyzer of a comparative example (e).

(2) The decomposition of ammonia

Each of the above stated catalyzers was placed in a tubular reactor made of quartz, and a gaseous mixture of ammonia and helium of $NH_3/He$ ratio being 1.0 was supplied at a prescribed reaction temperature and at the flowing velocity of 100 ml/min, under the atmospheric pressure, and reacted. The space velocity was 1000 ml/ml·h on the basis of ammonia.

Reaction products and unreacted ammonia recovered by the above operations were analyzed by a gas chromatograph. Results will be shown in the Table.

The reaction products were nitrogen and hydrogen only. With respect to the formation rates thereof, nitrogen was 0.5 times and hydrogen was 1.5 times of the decomposition rate of ammonia (the number of moles ammonia converted per unit volume of catalyzer and unit time).

As apparent from the Table, the catalyzers (1) to (11) exhibit the high activity for the decomposition of ammonia and remarkable effects at the low temperature of not more than 500° C. in comparison with the examples (a), (b), (c) and (d).

Having explained heretofore, the ammonia decomposition catalyzers according to the invention give the high ammonia decomposition activities at the low temperatures of not more than 500° C. and the remarkable effects.

TABLE

| No. | Catalyzers ( ): Weight Ratio | Ammonia conversion (%) at reaction temperatures | | | | | |
|---|---|---|---|---|---|---|---|
| | | 350° C. | 380° C. | 400° C. | 450° C. | 500° C. | 550° C. |
| Catalyzer (1) | $Ru-K_2O-Al_2O_3$ (0.5:5:94.5) | 31.8 | 59.0 | 78.0 | 98.2 | 100 | 100 |
| Comparative Example (a) | $Ru-Al_2O_3$ (0.5:99.5) | — | — | 21.1 | 57.5 | 83.5 | 91.2 |
| Catalyzer (2) | $Ru-K_2O-Al_2O_3$ (0.5:2:97.5) | — | 23.6 | 38.2 | 80.2 | 92.6 | 100 |
| Catalyzer (3) | $Ru-K_2O-Al_2O_3$ (0.5:10:89.5) | 29.2 | 50.1 | 69.5 | 89.7 | 100 | 100 |
| Catalyzer (4) | $Ru-K_2O-Al_2O_3$ (0.1:5:94.9) | — | 32.0 | 43.4 | 75.3 | 94.7 | 100 |
| Catalyzer (5) | $Ru-K_2O-Al_2O_3$ (2:5:93) | 31.3 | 55.3 | 74.8 | 91.3 | 100 | 100 |
| Catalyzer (6) | $Ru-Li_2O-Al_2O_3$ (0.5:5:94.5) | — | — | 24.4 | 59.5 | 88.9 | 100 |
| Catalyzer (7) | $Ru-Na_2O-Al_2O_3$ (0.5:5:94.5) | 21.8 | 43.6 | 64.1 | 100 | 100 | 100 |
| Catalyzer (8) | $Ru-Cs_2O-Al_2O_3$ (0.5:5:94.5) | — | 21.0 | 37.0 | 77.2 | 94.3 | 100 |
| Catalyzer (9) | $Ru-CaO-Al_2O_3$ (0.5:5:94.5) | — | 21.1 | 31.9 | 77.2 | 100 | 100 |
| Catalyzer (10) | $Ru-BaO-Al_2O_3$ (0.5:5:94.5) | — | 28.0 | 40.7 | 77.0 | 88.0 | 100 |
| Catalyzer (11) | $Ru-K_2O-MgO$ (0.5:5:94.5) | 22.9 | 42.7 | 62.3 | 100 | 100 | 100 |
| Comparative Example (b) | $Fe-Al_2O_3$ (2.8:97.2) | — | — | 1.2 | — | 5.4 | — |
| Comparative Example (c) | $Ni-SiO_2.Al_2O_3$ (20:80) | — | 7.4 | 19.9 | 47.7 | 83.4 | 95.7 |

TABLE-continued

| No. | Catalyzers ( ): Weight Ratio | Ammonia conversion (%) at reaction temperatures | | | | | |
|---|---|---|---|---|---|---|---|
| | | 350° C. | 380° C. | 400° C. | 450° C. | 500° C. | 550° C. |
| Comparative Example (d) | Pt—Al$_2$O$_3$ (0.5:99.5) | — | — | 1.1 | — | 1.8 | 1.9 |

INDUSTRIAL APPLICABILITY

As the ammonia decomposition catalyzers of the invention can decompose ammonia into hydrogen and nitrogen effectively, they decompose ammonia recovered from COG, whereby it is possible to produce an atmospheric gas to be used to the bright annealing of stainless steels and nickel steels by means of hydrogen gas obtained by said decomposition.

What is claimed is:

1. A catalyzer for decomposing ammonia, consisting essentially of a mixture of a basic compound in an amount of 1 to 20 weight percent and 0.1 to 2.0 weight percent ruthenioum which is impregnated into an alumina carrier, and then calcinated and reduced, so that the ammonia is decomposed at a temperature of not more than 500° C., wherein said basic compound is an oxide, a carbonate, a hydroxide, a nitrate or an acetate of an alkali metal or an alkaline earth metal.

* * * * *